(12) United States Patent
Castagno et al.

(10) Patent No.: US 7,016,543 B2
(45) Date of Patent: Mar. 21, 2006

(54) METHOD FOR PROVIDING A TERMINAL WITH CODED STILL IMAGE SIGNALS, COMMUNICATIONS SYSTEM, NETWORK ELEMENT AND MODULE

(75) Inventors: Roberto Castagno, Tampere (FI); Stephane Coulombe, Irving, TX (US)

(73) Assignee: Nokia Corporation, Espoo (FI)

( * ) Notice: Subject to any disclaimer, the term of this patent is extended or adjusted under 35 U.S.C. 154(b) by 656 days.

(21) Appl. No.: 10/151,532

(22) Filed: May 20, 2002

(65) Prior Publication Data

US 2002/0196982 A1 Dec. 26, 2002

(30) Foreign Application Priority Data

Jun. 2, 2001 (EP) ................... 01113470

(51) Int. Cl.
*G06K 9/36* (2006.01)
*G06K 9/46* (2006.01)

(52) U.S. Cl. .............. 382/233; 382/235; 382/250

(58) Field of Classification Search ................ 382/233, 382/235, 250; 375/240.1, 240.2, 240.25
See application file for complete search history.

(56) References Cited

U.S. PATENT DOCUMENTS

| | | | |
|---|---|---|---|
| 5,303,343 A | 4/1994 | Ohya et al. ................ 395/200 |
| 5,680,392 A * | 10/1997 | Semaan ...................... 370/261 |
| 5,784,631 A | 7/1998 | Wise .......................... 395/800 |
| 6,141,447 A * | 10/2000 | Linzer et al. ............... 382/236 |
| 6,181,823 B1 | 1/2001 | Takahashi ................... 382/232 |
| 6,320,600 B1 * | 11/2001 | Smith et al. ................ 715/723 |
| 6,373,817 B1 * | 4/2002 | Kung et al. ................. 370/217 |
| 2002/0126708 A1 * | 9/2002 | Skog et al. ................. 370/522 |

FOREIGN PATENT DOCUMENTS

| | | |
|---|---|---|
| EP | 0936801 A1 | 8/1999 |
| WO | WO 99/18728 | 4/1999 |

* cited by examiner

*Primary Examiner*—Phuoc Tran
(74) *Attorney, Agent, or Firm*—Perman & Green

(57) ABSTRACT

The invention relates to a method for providing a terminal MS2 of a communications system with coded still image signals. In order to enable a further content adaptation for multimedia messages, it is proposed that the method comprises receiving coded video signals at a network element of said communications system, converting at least a part of said received coded video signals in said network element to coded still image signals, and delivering said coded still image signals to a terminal MS2 of said communication system. The computation required for said conversion can be minimized by exploiting the commonalities of video and still images compression methods that are based on the Discrete Cosine Transform scheme. Thus it is rendered possible to provide excerpts of transmitted video clips also to terminals not capable of handling at least this particular video clip. The invention equally relates to a corresponding communications system, network element and module for a network element.

16 Claims, 1 Drawing Sheet

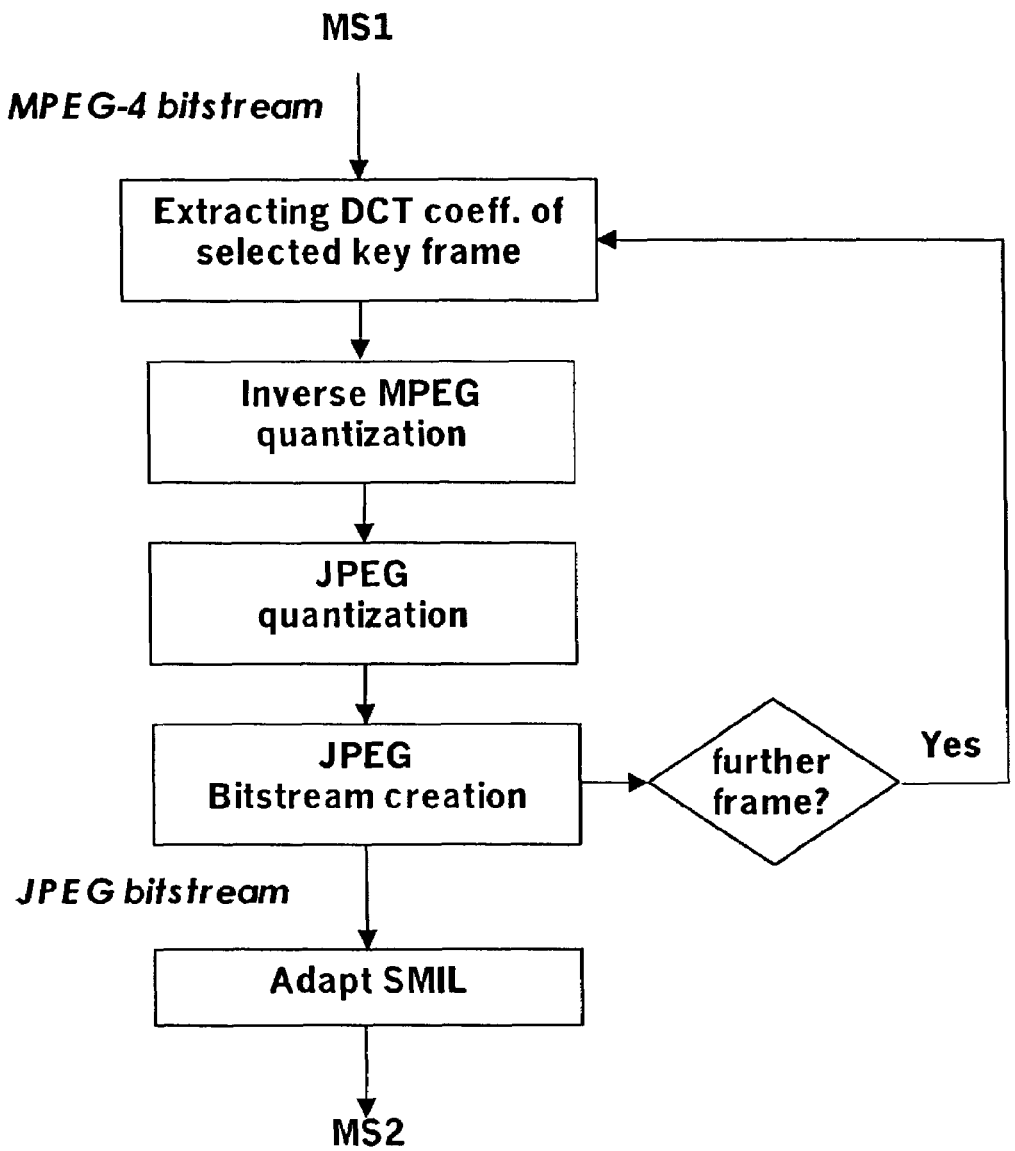

METHOD FOR PROVIDING A TERMINAL WITH CODED STILL IMAGE SIGNALS, COMMUNICATIONS SYSTEM, NETWORK ELEMENT AND MODULE

FIELD OF THE INVENTION

The invention relates to a method for providing a terminal of a communications system with coded still image signals. The invention equally relates to a communications system comprising at least one unit capable of handling providing video clips as coded video signals, at least one terminal capable of displaying received coded still image signals as still images, and at least one network element. Further, the invention relates to such a network element and to a module for such a network element.

BACKGROUND OF THE INVENTION

Multimedia messaging services will provide additional content to mobile communications, such as the transmission of audio and video clips, photographs and images, combined with the traditional text messaging.

In communications systems providing multimedia messaging services (MMS), terminals like mobile stations or personal computers (PC) will be able to send and receive multimedia information as far as they are equipped for a respective content. First MMS mobile terminals will be able to send and receive multimedia messages that include still images, text, and possibly sound, while other terminals are already able to handle video clips. A next generation of MMS mobile terminals will also be able to handle in addition multimedia messages including video clip. Thus, in particular at the beginning, there will terminals which can transmit multimedia messages including video clips, but also a great number of terminals which can handle only images. Also similarly equipped terminals may have different characteristics like for example different image resolutions or memory sizes, which equally has an effect on the services that can be made use of.

Some terminals, like PCs, may allow an upgrade of their capabilities, e.g. by plug-ins. An upgrade then enables the terminal to make use of desired multimedia messaging services.

Another possibility is that a content creator prepares several versions of the same service, to match e.g. different browsers, and thus to make a service available to differently equipped terminals.

With other terminals like mobile terminals, in contrast, the possibility of an upgrade will be rather limited. On the other hand, many contents will not be multi-version content creations, in particular those created by non professional users.

Thus it is desirable to be able to adapt multimedia content that is delivered to the capability of the receiving terminal. Such an adaptation of multimedia content can be carried out before delivery to the receiving terminal, in particular at a multimedia messaging service center of the network side of the communications system, which multimedia messaging service center also takes care of delivering the multimedia messages to the respective receiving terminal.

An example of a possible content adaptation is the modification of the resolution of a transmitted image in order to make it fit to different displays. Another example is a reduction of the message size in order to avoid transport or memory problems of the receiving terminal. Another adaptation can be given in form of a transcoding between different coding formats for the same media type, like a conversion from a JPEG image to a GIF image.

Because of the variety of MMS terminals in terms of capabilities, manufacturers etc., it will be important to provide content adaptations which are as comprehensive as possible. Content adaptation should not only be enabled for transmissions between terminals with similar media characteristics, e.g. between image phones, but also across media types, e.g. for transmissions between video phones and image phones.

SUMMARY OF THE INVENTION

It is an object of the invention to provide a further possibility of content adaptation for multimedia messages in a communications system.

This object is reached according to the invention on the one hand with a method for providing a terminal of a communications system with coded still image signals. The proposed method comprises in a first step receiving coded video signals at a network element of the communications system. In a second step, at least a part of said received coded video signals are converted in the network element to coded still image signals. And in a further step, the coded still image signals are delivered to a terminal of the communications system.

On the other hand, the object is reached according to the invention with a communications system comprising at least one unit capable of providing video clips as coded video signals, at least one terminal capable of displaying received coded still image signals as still images, and at least one network element. The network element of the proposed communications system includes means for receiving coded video signals originating from said unit capable of providing video clips. In addition, the network element includes means for converting at least a part of said received coded video signals to coded still image signals according to the proposed method. And further, the network element includes means for delivering said coded still image signals to said terminal of said communications system.

The invention is equally reached with such a network element. Finally, the object is reached with a module for such a network element comprising means for receiving coded video signals and for converting at least a part of said received coded video signals to coded still image signals according to one of the preceding claims.

The invention proceeds from the idea that when a video clip is provided to a network element for transmission to a terminal which is not able to display the transmitted video clip, the video clip still does not have to be completely lost for this terminal. The idea is realized by converting at the network element at least a part of received coded video signals to coded still image signals, before transmitting them to certain receiving terminals. The receiving terminals can be in particular terminals which are only capable to display still images, but also e.g. terminals supporting the display of video clips only to a restricted extend. The latter case may be given for example in case a terminal does not have enough memory available for storing an entire transmitted video clip.

The invention thus allows more terminals to be recipient of at least extracts of video clips. This leads to a maximum content adaptation for this aspect of multimedia messaging services also across media types, e.g. between video phones and image phones. In particular, interoperability between terminals of two successive generations may be enabled, which allows at the same time to provide a new kind of service for terminals not supporting an unrestricted handling of video clips.

Preferred embodiments of the invention become apparent from the subclaims.

In a preferred embodiment of the invention, a selected frame is extracted as key frame from received coded video signals. This extracted video frame is then delivered to the terminal as coded still image frame.

A frame can be selected for extraction by using simply the first video frame in the received coded video signals. This is on the one hand the easiest frame to detect in a video bitstream, the selection thus requiring little computation power. On the other hand, the first frame can be expected to be considered by the user of the transmitting unit the most important frame of the video clip. But equally, any other frame or a sequence of frames of the video clip can be selected for conversion. If the video signals comprise at regular intervals intra frames (I-frames), which are only encoded based on the information within this frame, in particular selected ones of these frames or even all of these frames can be used for creating still image frames. If several video frames are converted and delivered as image frames to a receiving terminal, this terminal can display them like a slide show, instead of displaying a single picture.

In a particularly advantageous embodiment of the invention, the received coded video signals are further compressed by a method based on discrete cosine transform (DCT) transformation. If the coded video signals are then converted to still image signals of a format employing equally a compression with a DCT transformation, the coded still image signals can be obtained without requiring a complete decoding of the received coded video signals. This makes the usage of terminals more efficient since it saves computation power.

But even if the same DCT compression scheme is employed for video signals and still image signals, the required quantization of the resulting DCT coefficients may be different. Therefore, it is proposed that first, quantized DCT coefficients for a selected frame are extracted from the bitstream formed by the received coded video signals. Next, an inverse quantization is performed on the extracted DCT coefficients based on the quantization used for the received coded video signals. And finally, the extracted DCT coefficients on which an inverse quantization was applied are quantized with the quantization required for the coded still image signals.

Multimedia messages will usually be accompanied by a presentation page written e.g. in the presentation language SMIL. This page informs the receiving terminal how the different media elements are to be displayed. Each media element is referred to with its name plus an indication of the kind of element, e.g. ".mpeg" in the case of a video clip or ".jpg" in the case of a still image. Therefore, it is further proposed that the presentation part of a message employed for transmitting the coded still image signals to a terminal are adapted so that it indicates that the message contains one or more still images instead of the original video.

The invention can be employed in an advantageous way if the coded video signals are MPEG or H.263 video clips, which are compressed by using a DCT transformation, and if the coded still image signals are to be JPEG images, which are equally compressed by using a DCT transformation.

The invention is particularly suited for rendering an additional multimedia messaging service to users. The conversion is advantageously carried out in a multimedia messaging service center, i.e. in a network element that is already used for delivering multimedia messages to a receiving terminal. This receiving terminal can be any kind of terminal. It can be in particular also a mobile terminal, for which certain updates might not be possible.

BRIEF DESCRIPTION OF THE FIGURES

In the following, the invention is explained in more detail with reference to a FIGURE which is a flow chart illustrating an embodiment of the method of the invention.

DETAILED DESCRIPTION OF THE INVENTION

The presented embodiment of the method of the invention is employed in a communications system according to the invention. In this system, a first mobile station MS1 can communicate with a second mobile station MS2 via a communications network which comprises as one network element a multimedia messaging service center. The first mobile station MS1 is capable of handling video clips, while the second mobile station MS2 is only capable of handling still JPEG images. A user of the first mobile station MS1 now wants to transmit an MPEG-4 video clip to the second mobile station MS2.

The first mobile station MS1 generates to this end a coded MPEG-4 video bitstream out of the video clip that is to be transmitted.

MPEG-4 video bitstreams comprise differently encoded frames. I-frames are only encoded based on the information of a single frame. Therefore, they do not depend on any other frames for decoding. P-frames, in contrast, contain predictive coded images which include only the difference from the previous frame. Similarly, B-frames contain bi-directionally predictive coded images, for which information of a preceding and following frame for are used. Therefore, only the I-frames can be used by themselves for retrieving a complete picture. The I-frames may be repeated in regular intervals in the bitstream in order to allow special reproduction modes.

I-frames are compressed for MPEG-4 based on a DCT transformation. The resulting DCT coefficients are further quantized based on quantization tables which are specific for MPEG-4.

The first mobile station MS1 then transmits the generated MPEG-4 video bitstream as a multimedia message via the communications network, and within the network via the multimedia messaging service center. The message is accompanied by a SMIL presentation page indicating that the multimedia message contains an MPEG video clip.

The multimedia messaging service center is primarily responsible for delivering received multimedia messages to the respective receiving terminal. Since in this case the receiving mobile station does not support the handling of video clips, however, the encoded video bitstream has first to be processed in the multimedia messaging service center, in order to obtain still images and thus to render the video clip usable for the receiving mobile. The multimedia messaging service center comprises a plug-in adaptation module which is responsible for all conversions required for providing comprehensive multimedia messaging services. One component of this module is provided for converting coded video signals into coded still image signals.

The only FIGURE is a flowchart illustrating the basic processing by this component of the adaptation module of the multimedia messaging service center. An incoming MPEG-4 video bitstream originates from the first mobile station MS1.

In a first step, the quantized DCT coefficients for the first I-frame of the received MPEG-4 video bitstream are extracted.

Since a DCT transformation is employed for obtaining both, MPEG-4 video and JPEG image bitstreams, the extracted DCT coefficients do not have to be decoded and re-encoded again in order to obtain a JPEG image. However, the video and image compression schemes differ in the ways in which the DCT coefficients are quantized. Therefore, in a next step the extracted DCT coefficients are inversely quantized using the MPEG-4 quantization tables.

Then, the DCT coefficients are quantized again, this time using JPEG quantization tables. In a further step, the generation of the JPEG bitstream is completed with the entropy encoding, as for a normal JPEG encoding process.

By exploiting the common DCT roots of MPEG-4 and JPEG, it is therefore possible to perform a key-frame extraction without having to carry out resource intensive DCT inverse and direct transformations.

A final step is now employed for adapting the SMIL presentation page that is to accompany the multimedia message in which the JPEG bitstream is transmitted to the second mobile station MS. This means, the indication that the bitstream includes an MPEG video clip is substituted by an indication that the bitstream includes a JPEG image, in order to enable the receiving mobile station MS2 to address appropriately a still image instead of a video. The multimedia message is then delivered to the second mobile station MS2, where the included JPEG image it is displayed as key-frame.

As indicated in the FIGURE, the depicted and described steps can be repeated in order to obtain not only a single still image out of a received video clip, but rather a sequence of still images. In the repetitions, it is then not the coefficients of the first I-frame that are extracted from the video bitstream but respectively a selected one of the following I-frames.

The second mobile station MS2 receives in this case a series of multimedia messages with JPEG images and is thus able to display a series of still images to a user.

What is claimed is:

1. Method for providing a terminal (MS2) of a communications system with coded still image signals, said method comprising:
   receiving coded video signals at a network element of said communications system;
   converting at least a part of said received coded video signals in said network element to coded still image signals; and
   delivering said coded still image signals to said terminal (MS2) of said communications system.

2. Method according to claim 1, wherein said received coded video signals are converted to coded still image signals by extracting at least one selected video frame of the coded video signals and by delivering the extracted video frame as at least one coded still image frame to said terminal.

3. Method according to claim 1, wherein said received coded video signals are compressed by a method based on discrete cosine transform (DCT) transformation and wherein said coded video signals are converted to coded still image signals compressed by a method based on DCT transformation, without decoding the coded video signals completely.

4. Method according to claim 3, comprising
   extracting quantized DCT coefficients belonging to one video frame from a bitstream constituting the received coded video signals;
   performing an inverse quantization on the extracted quantized DCT coefficients based on the quantization used for the received coded video signals; and
   quantizing the quantized extracted DCT coefficients on which an inverse quantization was applied with the quantization required for the coded still image signals.

5. Method according to claim 4, further comprising adapting the presentation part of a message employed for transmitting the coded still image signals to said terminal so that it indicates that the message contains one or more still images instead of the original video.

6. Method according to claim 1, wherein the first video frame in the received coded video signals is selected for conversion to a coded still image frame.

7. Method according to claim 1, wherein a series of selected video frames in the received coded video signals is selected for conversion to a series of coded still image frames which are delivered to the terminal (MS2).

8. Method according to claim 1, wherein the coded video signals are constituted by MPEG or H.263 video clips.

9. Method according to claim 1, wherein the coded still image signals are constituted by a JPEG image or a series of JPEG images.

10. Method according to claim 1, employed for providing a multimedia messaging service.

11. Communications system comprising at least one unit (MS1) capable of providing video clips as coded video signals, at least one terminal (MS2) capable of displaying received coded still image signals as still images, and at least one network element, said network element including
   means for receiving coded video signals originating from said unit (MS1) capable of providing video clips;
   means for converting at least a part of said received coded video signals to coded still image signals according to claim 1; and
   means for delivering said coded still image signals to said terminal (MS2) of said communications system.

12. Communications system according to claim 11, wherein the terminal (MS2) to which the coded still image signals are delivered is a mobile terminal.

13. Communications system according to claim 11, wherein said unit capable of providing video clips as coded video signals is equally a terminal (MS1).

14. Network element for a communications system, said network element comprising:
   means for receiving coded video signals element;
   means for converting at least a part of said received coded video signals to coded still image signals according to claim 1; and
   means for delivering said coded still image signals to a terminal (MS2) of said communications system.

15. Network element according to claim 14, characterized in being a Multimedia Messaging Service Center (MMSC).

16. Module for a network element of a communications system, said module comprising, means for receiving coded video signals and means for converting at least a part of said received coded video signals to coded still image signals according to claim 1.

* * * * *